R. M. NEWBOLD.
BATTERY TERMINAL.
APPLICATION FILED FEB. 14, 1912.
1,048,574.
Patented Dec. 31, 1912.
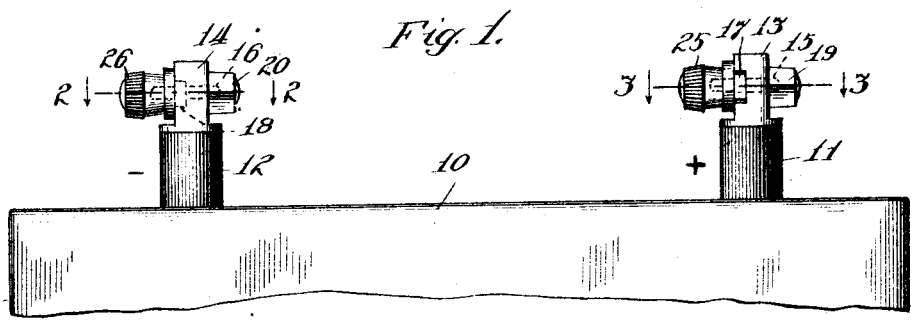
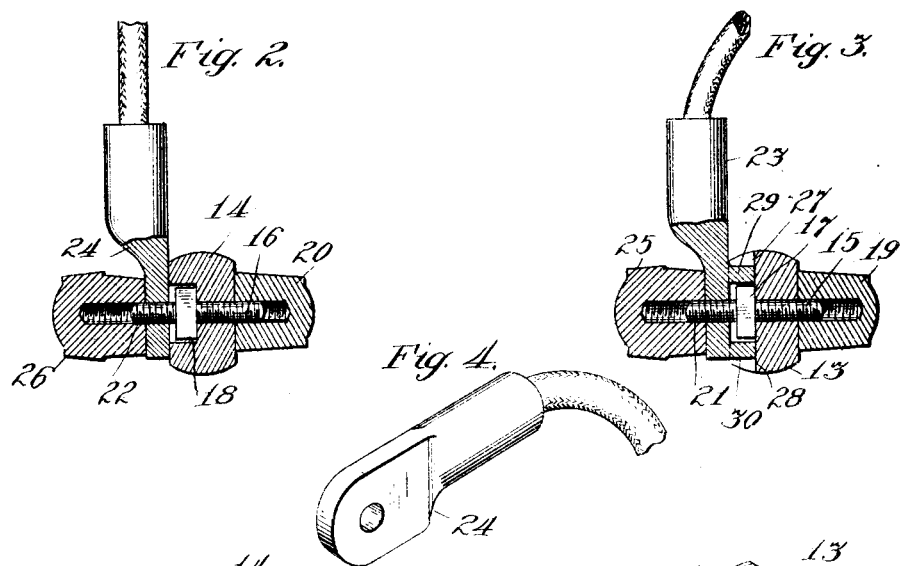
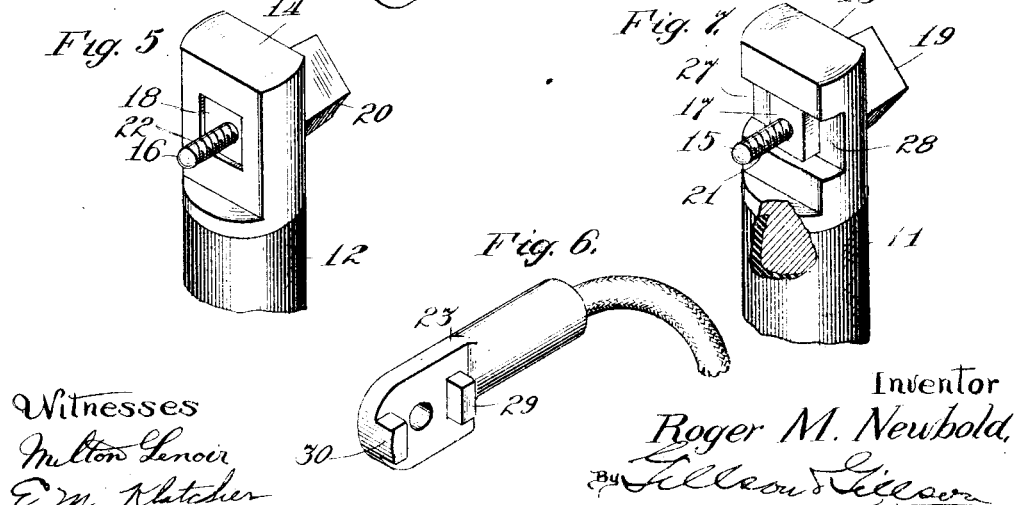
Witnesses
Milton Lenoir
E. M. Fletcher
Inventor
Roger M. Newbold,
By Gillson & Gillson
Attorneys.

UNITED STATES PATENT OFFICE.

ROGER M. NEWBOLD, OF CHICAGO, ILLINOIS, ASSIGNOR TO THE ADAMS & WESTLAKE COMPANY, A CORPORATION OF ILLINOIS.

BATTERY-TERMINAL.

1,048,574.     Specification of Letters Patent.     Patented Dec. 31, 1912.

Application filed February 14, 1912. Serial No. 677,410.

*To all whom it may concern:*

Be it known that I, ROGER M. NEWBOLD, a citizen of the United States, residing at Chicago, county of Cook, and State of Illinois, have invented certain new and useful Improvements in Battery-Terminals, of which the following is a specification and which are illustrated in the accompanying drawings, forming a part thereof.

The invention relates to terminals for storage or secondary batteries having for its object the provision of means for insuring the connection of the positive and negative branches of an electric circuit with the positive and negative poles, respectively, of the battery.

In certain situations, as in the electric systems of automobiles, it is becoming a common practice to provide a dynamo driven by the engine of the vehicle and which not only provides current for the lamps and for the engine ignition but charges a storage battery which supplies the current for the lamps when the engine is not running. In such systems it is, of course, essential that the positive and negative leads from the dynamo be connected, respectively, with the positive and negative poles of the battery. Ordinarily the operators having the care of such vehicles are without electrical training, and in such hands such systems become unreliable because of the danger of the connections being made improperly.

The invention consists in terminals so formed that it is impossible to connect at least one of the branches of the circuit with the wrong pole of the battery.

In the accompanying drawings Figure 1 is a detail of the upper portion of a storage battery showing its terminals; Fig. 2 is a sectional view on the line 2—2 of Fig. 1; Fig. 3 is a sectional view on the line 3—3 of Fig. 1; Fig. 4 is a detail of the terminal of one, which may be designated the negative, branch of the circuit; Fig. 5 is a detail of the corresponding battery terminal; Fig. 6 is a detail of the terminal of the other branch of the circuit; and Fig. 7 is a detail of the other terminal of the battery.

A portion of a storage battery is represented at 10; one of its terminals, which is indicated as the positive terminal, is shown at 11, and the other, indicated as the negative terminal, is shown at 12. The upper ends 13, 14, of these terminals are flattened, and through the flattened portion of each there is set a stud, as 15, 16, projecting beyond each face of the terminal and threaded at both ends. An integral boss 17, 18, is formed on each stud and is polygonal in form to fit within a suitable recess, thereby preventing the stud from turning. A nut, as 19, 20, is applied to the rearward projecting end of each stud to securely bind it in place, drawing the boss into the recess provided for it. The forward end 21, 22, receives the eye of the line terminals 23, 24, and nuts 25, 26, applied to the forward projecting ends of the studs, bind these terminals in place.

The recess of the positive terminal is in the form of a channel extending entirely across its front face, thus providing pockets 27, 28, at either side of the boss 17. The line terminal 23 coöperating with the positive terminal 11, is provided with a pair of laterally projecting lugs 29, 30, which enter these pockets. The recess formed in the terminal 12 for receiving the boss 18 is of the same shape as the boss and of such size as to provide a snug fit therefor, so that a flattened face of the terminal extension 14 is provided for a corresponding face of the line terminal 34. The studs 21, 22, are of such length that their forward ends project but a short distance beyond the line terminals, and hence should an attempt be made to apply the terminal 23 to the battery terminal 12 its outer face would be even with or project beyond the end of the stud, thus rendering it impossible to apply the securing nut 26. The operator would therefore find it necessary, in order to connect the branches of the line circuit, to apply the terminal 23 to the terminal 11.

While the form of construction as hereinbefore described and as illustrated in the drawings is preferred, it is obvious that various changes could be made without departing from the broader scope of the invention.

I claim as my invention—

1. In terminals for storage batteries, in combination, a post having a transverse channel, a threaded stud set through the post and projecting beyond the channel, a line terminal having an eye for receiving the stud, and lugs for entering the channel, and a nut engaging the threaded end of the stud.

2. In terminals for storage batteries, in combination, a pair of posts, threaded studs differing in length set through the posts, a pair of line terminals each having an eye for receiving one of the studs, such terminals being of unequal thickness, and nuts engaging the ends of the studs.

3. In terminals for storage batteries, in combination, a pair of flattened posts each having an aperture in one of its faces, the aperture in one only of the posts being in the form of a channel extending across the post face, threaded studs set through each post and passing through and beyond the aperture thereof, a pair of line terminals each having an eye for engaging one of the studs, one of such terminals having a flat face for bearing against the post and the other of such terminals having lateral lugs for entering the post channel, and nuts engaging the studs.

ROGER M. NEWBOLD.

Witnesses:
Louis K. Gillson,
E. M. Klatcher.